No Printed Specification Available
9401X
T. Adair,
Truss.
Patented Feb. 17, 1836.
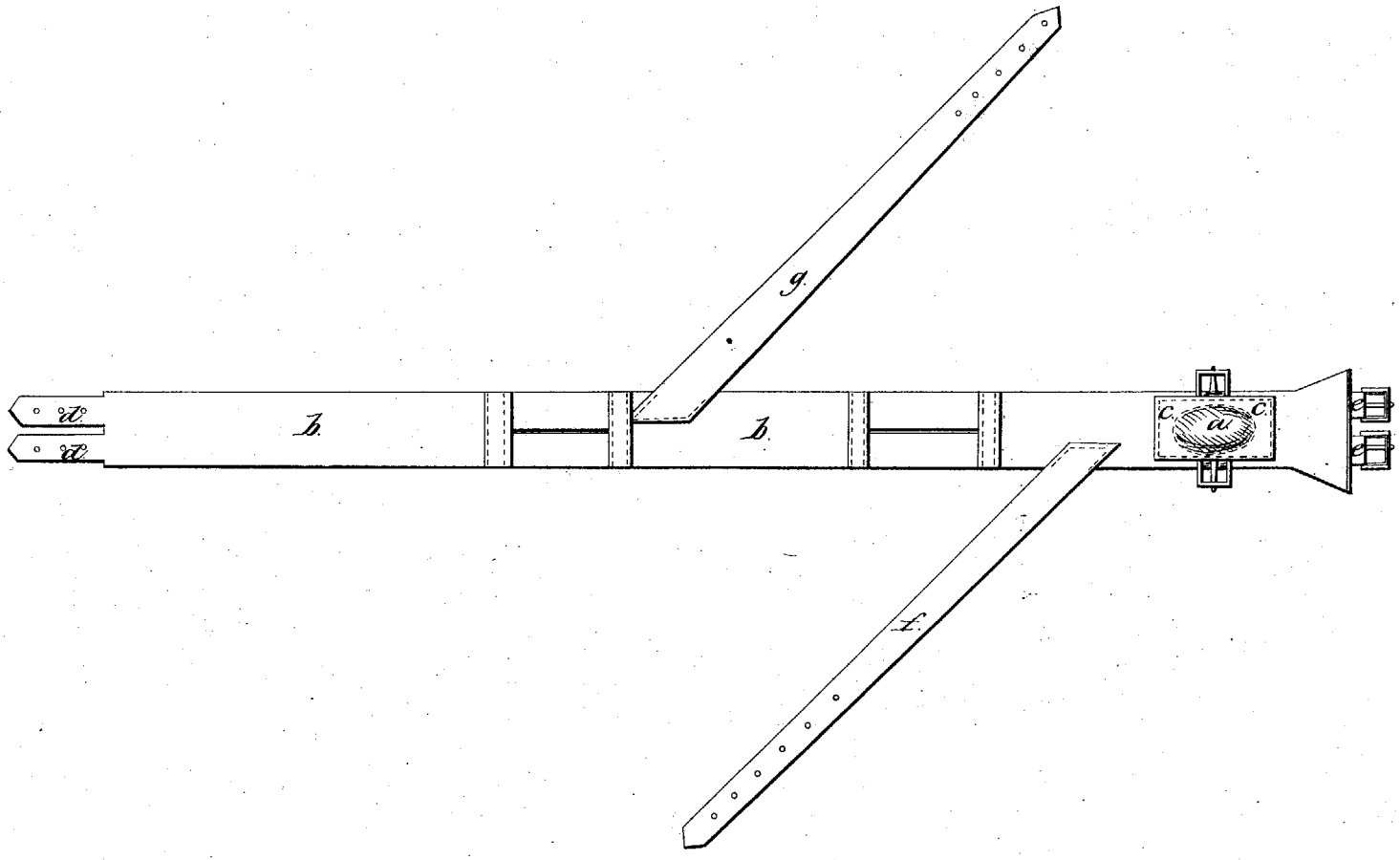
AM. PHOTO-LITHO. CO. N.Y. (OSBORNE'S PROCESS.)

Feb. 17. 1836 9401X

Wm William Adair

Letters Patent

The schedule referred to in these Letters Patent and making part of the same containing a description in the words of the said William Adair himself of his improvement in the Truss for the cure of Hernia.

Be it known that I William Adair of Pleasant Hill Mercer County State of Kentucky have invented a new and useful improvement in the Truss for the cure of ruptures in the human body which is described as follows reference being had to the annexed drawings of the same, making part of this specification. The rupture pad is made of wood of a semi-oval figure as represented at a. covered with buckskin and secured to the belt or band b. passing around the body by a flat piece of buck skin c. sewed to the covering of the block or pad on the flat side thereof. and then sewed to the belt or band before mentioned. which belt or band is made of gum elastic & leather, and when passed around the body is secured by straps d. and buckles e. It is further secured by a strap f. which passes around the thighs. and by another strap g. which passes over the shoulder. The application of this Truss causes a pressure in a direction obliquely upwards and outwards in the direction of the abdominal canal by the inelastic hard wooden pad — thus effecting a permanent adhesion in the parts around the external abdominal ring by causing local inflammation about the said ring. What I claim as my invention and which I desire to secure by Letters Patent consists in the before described truss for the cure of ruptures in the human body Wm Adair.

Witnesses Henry Vandeveer

330K82 Nicholas Joyckoff